United States Patent [19]

Sikora

[11] 3,996,432
[45] Dec. 7, 1976

[54] KEY CONTROLLED ALARM ACTIVATING SYSTEM

[76] Inventor: Christopher M. Sikora, 18 W. 276 Buckingham Lane, Villa Park, Ill. 60181

[22] Filed: Sept. 17, 1975

[21] Appl. No.: 614,076

[52] U.S. Cl. .............................................. 200/44
[51] Int. Cl.² ..................................... H01H 27/06
[58] Field of Search ............ 200/DIG. 29, 44, 42 R, 200/277

[56] References Cited

UNITED STATES PATENTS

| 2,201,881 | 5/1940 | Bryant et al. | 200/DIG. 29 |
| 3,515,832 | 6/1970 | Martin | 200/44 X |

Primary Examiner—Herman J. Hohauser
Attorney, Agent, or Firm—Hill, Gross, Simpson, Van Santen, Steadman, Chiara & Simpson

[57] ABSTRACT

A system particularly adapted for vehicular use enabling a theft alarm system to be armed or disarmed through normal key locking and unlocking operations as in a door. The system employs a switch mechanism and lever means interconnecting the switch mechanism with the tumbler assembly of a door locking mechanism. A key-actuatable switch assembly is provided for preferred systems.

7 Claims, 12 Drawing Figures

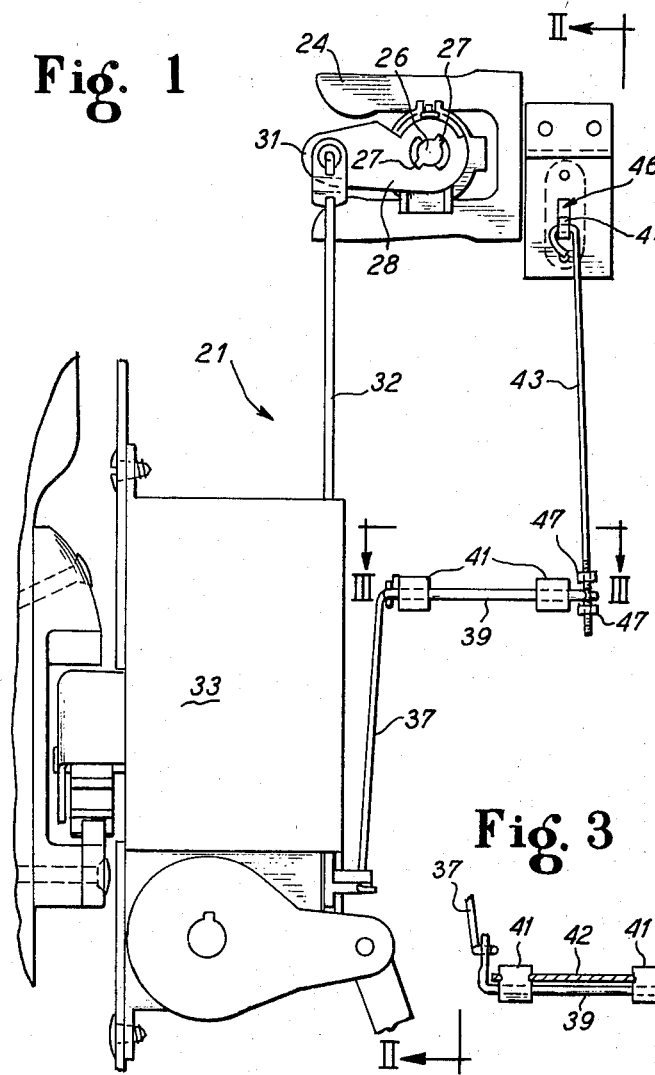
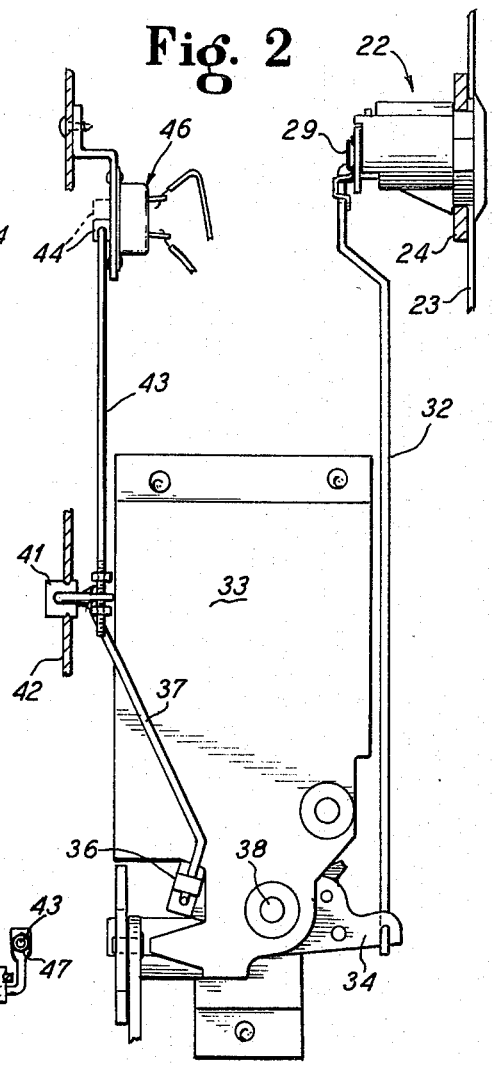
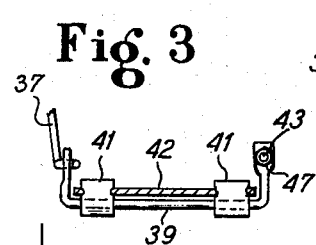
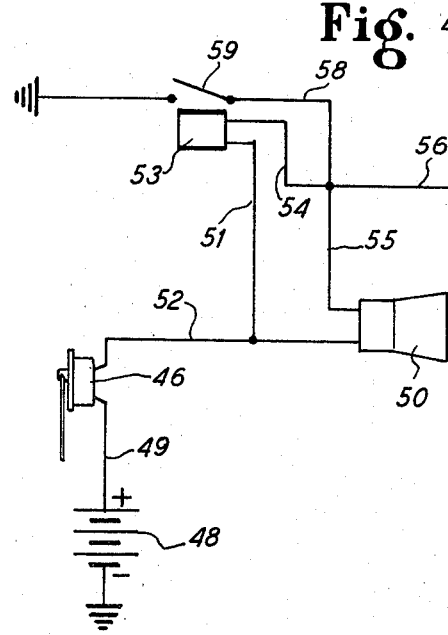
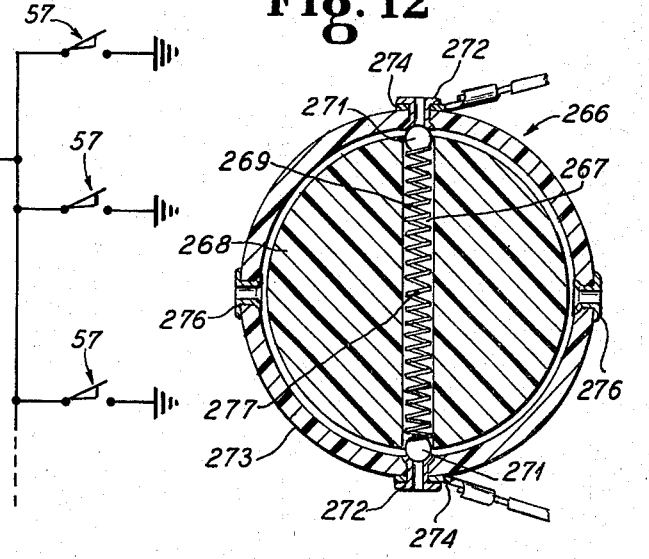

KEY CONTROLLED ALARM ACTIVATING SYSTEM

BACKGROUND OF THE INVENTION

The theft rate of automobiles and other wheeled vehicles has stimulated the development of burglar alarm systems which are adapted to let out a noise when triggered through the actions of an intended thief in endeavoring to remove portions of a given vehicle or even to gain access thereto.

So far as I am now aware, such alarm arrangements have been heretofore actuated, that is, armed or disarmed, by either one or two techniques. Thus, by one technique, a special lock is provided somewhere on the body of the vehicle which can be opened or closed by a key controlled by an operator exteriorly located with respect to the vehicle. The lock in this case only activates or deactivates a mercury switch controlling alarm activation. The lock itself is located somewhere on the vehicle and serves no function in actually locking or unlocking portions thereof. This technique suffers from the disadvantage that any intended thief by merely inspecting exterior surfaces of the vehicle, can determine whether the vehicle is equipped with an alarm system, thereby suggesting techniques for foiling operation of the system. For example, a sharp rap of the lock itself will break the glass vial of the switch. Another disadvantage of this technique lies in the fact that a vehicle operator must not only lock up his vehicle upon leaving same, but must also separately unlock the alarm system, requiring extra time-consuming operations. A further disadvantage is that such technique requires the employment of expensive lock and key switches and installation charges.

The other technique involves a delay mechanism which permits a vehicle operator a short interval of time after unlocking, for example, a door, to enter his vehicle and accomplish engine ignition before an alarm system is triggered. This technique suffers from the disadvantage that skilled thieves require only a few seconds of time to reach and accomplish removal of expensive accessory components in an automobile. Another disadvantage lies in the fact that this technique requires expensive auxiliary equipment and associated installation charges.

So far as I am now aware, no one has heretofore provided a simple and commercially practical technique for arming and disarming alarm systems for vehicles which operates directly by merely inserting a key into a vehicular lock, such as a door lock and using such key to, for example, lock or unlock the door, thereby arming or disarming, respectively, some prechosen alarm system associated with the vehicle.

BRIEF SUMMARY OF THE INVENTION

More particularly, by the present invention there is provide a key controlled alarm activating apparatus. In one aspect, this apparatus employs a combination of a key actuated lock tumbler assembly including a housing therefor, an electrical switch, lever means interconnecting said tumbler assembly with said electrical switch, and lost motion means for preventing movements of the lock tumbler assembly from excessive movement of said electrical switch between the open and closed positions thereof. The lost motion means is further adapted to maintain the switch in a desired closed or open position, even though the lock tumbler assembly is returned to a neutral position at the termination of a normal locking or unlocking operation, as the case may be.

In one preferred aspect, the present invention relates to a key actuatable switch assembly which is adapted to be interconnected with a key actuated lock tumbler assembly and which is further adapted to combine the electrical switch means, the lever means, and the lost motion means into a single small compact assembly.

A primary aim of the present invention is to provide an improved system for arming or disarming a vehicular alarm system in which normal key opertion in locking or unlocking a door lock or the like concurrently serves to arm or disarm the alarm apparatus.

Other and further objects, aims, purposes and the like will be apparent to those skilled in the art from a reading of the present invention taken with the drawings, wherein:

BRIEF DESCRIPTION OF THE DRAWINGS

In the drawings:

FIG. 1 is a fragmentary view in side elevation, some parts thereof being broken away and some parts thereof being shown in section, of one embodiment of an alarm activating system of the present invention;

FIG. 2 is a view taken generally along line II—II of FIG. 1;

FIG. 3 is a view taken along the line III—III of FIG. 1;

FIG. 4 is an illustrative schematic diagram of one electrical circuit for an alarm system activatable by the alarm activating system shown in FIGS. 1 through 3;

FIG. 12 is a fragmentary view which is similar to the view shown in FIG. 8, but illustrating a still further embodiment of an alarm activating system of the present invention.

DETAILED DESCRIPTION

Figure 5:
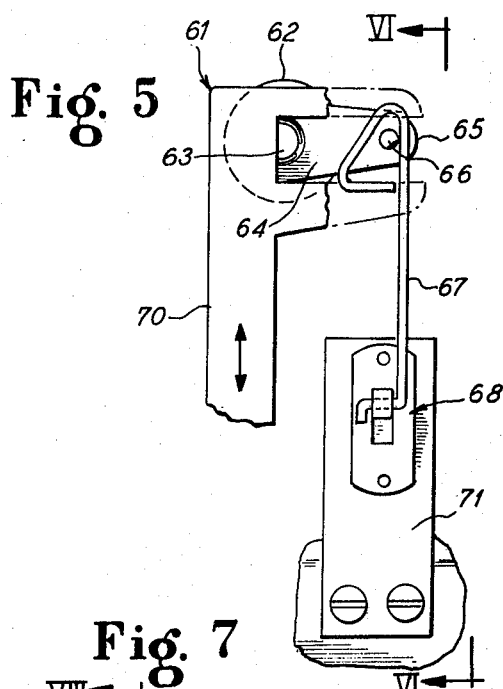
FIG. 5 is a side elevational view illustrating an alternative embodiment of an alarm activating system of the present invention.

Turning to the drawings there is seen in FIGS. 1 through 3 an embodiment of a key controlled alarm activating system of this invention herein designated in its entirety by the numeral 21. The system 21 employs a conventional key activated, axially revolvable arcuately; lock tumbler assembly designated in its entirety by the numeral 22, the housing of which is illustrated, for example, in FIG. 2. This lock tumbler assembly 22 is of the type conventionally found upon an automobile and the assembly 22 is shown mounted through the outside door panel 23 being retained in place by means of a retaining ring 24 on the inside of the door panel 23.

A shaft member 26 which is axially aligned with the tumbler assembly 22 undergoes revolvable movements with the tumbler assembly internally. The shaft member 26 projects rearwardly from the housing of the tumbler assembly 22 and has a pair of integral ears radially extending in opposed relationship to one another from the terminal portion of the shaft 26. A flattened lever is pivotally mounted over the end of shaft member 26 being secured thereby by means of a retaining ring 29. The lever 28 is adapted to provide pivotal movements at the outside end 31 thereof whenever the tumbler assembly is pivoted with a key (not shown), the degree of pivotal movement afforded to the lever 28 being controlled by abutment of the ears 27 against the circumferentially spaced recesses formed in the lever 28 in the region of ears 27 at the location where the shaft member 26 extends through the lever 28, thereby providing a species of lost motion to the lever 28 with respect to arcuate rotational movements of the tumbler assembly 22, for reasons that will hereinafter be explained more fully.

The outside end 31 of the lever 28 is interconnected with a lever arm 32 at one end thereof. The opposite end of lever arm 32 interconnects with a fulcrum member 34 protruding from the gear box 33 of the door actuating mechanism employed for a vehicular door. Gear box 33 is of conventional design; for example, a gear box is found in the door of a Mercury Cougar automobile and also in the doors of all American and foreign made automobiles. Pivotal movement of the fulcrum 34 actuates a door locking mechanism interiorly contained within the gear box 33. Also, pivotal movement of the fulcrum 34 incidentally produces a pivotal movement of the lever arm 36 projecting in generally opposed relationship to the fulcrum 34. Lever arm 36 has joined thereto at one end thereof a lever arm 37.

Fulcrum 34 pivots on shaft 38 in gear box 33 as does lever arm 36. As the fulcrum 34 moves downwards, in this embodiment, the lever arm 36 moves upwards. When the lever arm 36 moves upwards, so does the lever arm 37 (lever arm 37 can also be considered to be the connecting rod 37). Connecting rod 37 is joined at its opposite end to a pivot link 39 as shown in FIGS. 1 through 3 (but see especially FIG. 3). As the connecting rod 37 moves upwards, pivot link 39 oscillates about bearing buttons 41 (paired). The bearing buttons 41 are supported in a door panel 42. Thus, as one end of pivot link 39 moves upwards, so does its opposite end. Such opposite end of pivot link 39 is flattened similarly to the starting end but is turned at 90° with respect to the starting end. Through a hole formed in the terminal end of pivot link 39 is extended a switch actuator rod 43. The switch actuator rod 43 at its gravitationally upper end has a hook formed therein which is inserted through the button 44 of a switch assembly 46 thus, as the switch actuator rod 43 moves upwards and downwards, the switch assembly is controlled in on and off positions through movement of the button 44 by the switch actuator rod 43.

The gravitationally lower end of the switch actuator rod 43, as mentioned, projects through a hole formed in the terminal end of the pivot link 39. The lower end of the switch actuator rod 43 is threaded and provided with a pair of nuts or clamps 47. Nuts 47 or like adjustable means are presently preferred in order to provide adjustability of their respective relative positions on the rod 43. The nuts 47 are used to control the position of the pivot link relative thereto and also to limit upwards and downwards travel of the rod 43. Also, the nuts 47, by the spacing therebetween, provide a species of lost motion. The amount of lost motion is predetermined by the distance through which the button 44 is to travel during movement of the switch button 44 during closing and opening movements. Thus, as a key is turned in tumbler assembly 22, the switch assembly 46 is turned on or off as the case may be. Turning in a locking direction activates the alarm system turning in an open direction opens the switch assembly 46. In this embodiment, as those skilled in the art will appreciate, the switch actuator rod 43 replaces a similar rod used to control the door locking pin projecting conventionally upwardly through the window frame of an automobile door.

While the lost motion means provided by the combination of the nuts 47 on rod 43 coacting with the pivot link 39 serves to prevent over-run in operation of the button 44 of switch assembly 46, the lost motion provided by the lever 28 in combination with the ears 27 of the shaft member 26 serves a different purpose. Thus, most tumbler assemblies are designed so that a key inserted thereinto is not removable unless the tumbler assembly is in a neutral position. Therefore, after a locking or opening operation of a key in a tumbler assembly, it is typically necessary to turn a tumbler assembly to a neutral position as, or before, a key therein is removed. In the system of the present invention, such a reverse turning action, where the lost motion arrangement indicated is not present, would result in a deactivation of the alarm system. Therefore, the ears 27 permit the lever 28 to first operate the switch assembly 46, and then, as the ears reverse their direction of rotational movement as the key is withdrawn, no movement of the lever 28 occurs, so that the switch assembly remains in a locked or closed position. During switch deactivation, a reverse procedure occurs.

FIG. 4 illustrates a typical circuit of the type employed in an alarm system of the vehicular type. Here a car battery 48 is used as a power source. In the line 49 leading to switch 46 from battery 48, as those skilled in the art will appreciate, a number of other electrically operated components are connected. Switch 46, however, is electrically directly interconnected with the battery 48. The other terminal of the switch 46 leads an alarm assembly 50. When the switch 46 is closed, a circuit through the switch 46 to the alarm 50 is formed. A branch line 51 in the alarm line 52, which line 51 is interconnected with the relay 53 at the second terminal of the relay, feeds back into a line 54 which joins an alarm return line 55. The line 56 interconnects the alarm line 55 and the relay return line 54 with a plurality of switches designated generally by the number 57.

Each of the switches 57 can be considered to be a normally closed switch which is physically held open by the particular accessory to which the switch is interconnected or associated physically. If that accessory, door member, or the like is tampered with, or altered in its physical relationship to the vehicle involved, the switch is released and closes. When a switch 57 closes the complete circuit results and the alarm is actuated via ground. A line termed the relay contact line 58 at this point is activated because the relay with the closing of the circuit becomes activated and pulls down a relay contact 59 with which the line 58 is associated and returned to ground. As soon as the relay contact 59 is closed the secondary or holding circuit is established which maintains the functioning of the alarm 50 even if the switch or switches 57 is allowed to be reopened, as when a burglar releases his grasp of a car object or returns such car object to its initially normal position. The entire alarm circuit is turned off simply by inserting a key into the tumbler assembly 22 and turning the switch assembly 46 to an off position.

Figure 6:
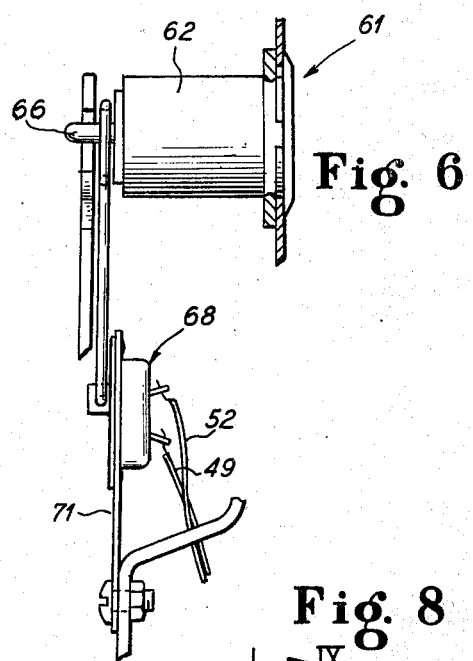
FIG. 6 is a view taken along the line VI—VI of FIG. 5.

Turning to FIGS. 5 and 6, there is seen a further embodiment of a system of this invention which system is herein designated in its entirety by the numeral 61. System 61 employs a tumbler assembly 62 similar to tumbler assembly 22. The shaft 63 associated with the tumbler assembly 62 correctly interconnects with a lever 64 which, consequently, pivots at its outer end portion 65. A pin 66 extending from outer end 65 extends through a hook formed in the gravitationally upper end of a rod 67, the rod 67 being comparable to the rod 43 in the system 21. Rod 67 interconnects with the switch assembly 68. The switch assembly 68 can be considered comparable to the switch assembly 46 of the system 21 both in structure and in function. This hook at the upper end of the rod 67 in embodiment 61 provides the same lost motion function that is provided by the nuts 47 on the rod 43 as a protection against over-travel of a switch 68 in embodiment 21.

The fork link 70 is a conventional part of the door locking assembly in certain automobiles, such as a Volkswagen, and does not constitute any part of the present invention.

The switch 68 is, as shown, conveniently mounted on a bracket 71 which is associated with the automobile door panel. Wires 49 and 52 interconnect the switch 68 with a circuit such as that shown in FIG. 4.

Turning to FIGS. 7 through 10, there is seen one embodiment of a key actuatable switch assembly of this invention herein designated in its entirety by the numeral 200. The switch assembly 200 employs an electrically non-conductive housing 201 which has cylindrical side walls 202 and an interconnecting end wall 203. The end wall 203 has an axially extending channel 204 defined therein.

The switch assembly 200 is provided with an electrically conductive or non-conductive key receiver 206 which has an integral, cross-sectionally circular body portion 207 extending through the channel 204 and having an axially extending key way 208 defined therein on the outer face 209 thereof. The key receiver 206 further has an integral cross-sectionally circular base portion 211 which is generally coaxial with the body portion 207. The base portion 211 is located in the interior of the housing 201 and has a shorter radius than does the body portion 207.

The key receiver 206 is provided with flange means. Thus, in the embodiment shown, a circumferentially extending flange 212 extends radially outwardly from the body portion 207 between the body portion 207 and the base portion 211. The flange means is adapted to make sliding face-to-face engagement within side regions 213 of the housing 201 rotated adjacent the channel 204.

A pair of integral wings 214 and 216 are associated with the key receiver 206. The wings 214 and 216 extend in radially opped relationship to one another and also in radially outwardly extending relationship from the circumferential side wall portions 217 of the base portion 211.

The assembly 200 is also provided with an electrically non-conductive ring member 218 which is positioned interiorly of the housing 201 and is generally coaxially located with respect thereto. The ring member 218 has a cross-sectionally circular aperture 219 defined in the forward face 220 thereof. The aperture 219 is adapted for receipt therein of the base portion 211 in the assembled switch assembly 200.

A pair of arcuately extending recesses 222 and 223 are defined in the forward face 220 in radially opposed relationship to one another and also in radially outwardly extending relationship to the circumferential side wall portions 224 of the aperture 219 in the ring member 218. The recesses 222 and 223 are adapted for receipt therein of the wings 214 and 216, wing 214 being in recess 222 and wing 216 being in recess 223. The recesses 222 and 223 cooperate with the wings 214 and 216 to permit limited rotational movement of the wings 214 and 216 within the recesses 222 and 223 between radially extending, circumferentially spaced engagement positions therebetween.

A cross-sectionally circular opening 226 is defined in the rearward face 227 of ring member 218. Also, a radially extending passageway 228 is defined in the ring member 218 between the opening 226 and circumferentially extending side wall portions 229 of ring member 218.

An electrically conductive, cross-sectionally circular pin 231 is positioned in the opening 226 and the pin 231 projects across the radially inner mouth 232 of the passageway 228. The pin 231 includes spring biasing means 233 yieldingly urging the pin 231 axially outwardly away from the ring member 218 with respect to the rearward face 227 thereof.

An electrically conductive ball, 234 is positioned in the radially outer mouth 236 of the passageway 228. The ball 234 includes an electrically conductive biasing means such as a metallic spring 237 which both yieldingly urges the ball 234 radially outwardly from the ring member 218 and also electrically interconnects the ball 234 with the pin 231.

Assembly 200 is provided through the wall of housing 201 thereof with at least one first electrically conductive contact means. Thus, in the embodiment shown, such contact means is provided by the hollow rivet 238 and by the hollow rivet 239. Each of the hollow rivets 238 and 239 terminates inwardly and adjacently with respect to the inside surfaces 241 of the side walls 202 of housing 201 in a cup shaped pocket 242 and 243, respectively. Each pocket 242 and 243 is adapted for receipt therein of a portion of the ball 234. Each rivet 238 and 239 is radially and axially aligned with the ball 234. Also, each rivet 238 and 239 is circumferentially spaced from the other thereof in the side wall 202 of housing 201 by an angle greater than the angle subtended by each of the recesses 222 and 223 to enhance positive switching action in an assembly 200.

The assembly 200 or the like in accordance with the teachings of this invention is further provided with a second electrically conductive contact means for making electrical contact with the pin 231. This second electrically conductive contact means is so located relative both to the pin 231 and to the first contact means (above described) that an electrically conductive path between the first contact means and the second contact means exists which passes through the pin 231 when the ball 234 is engaged with the first contact means (such as hollow rivet 239, see FIG. 8) when the ball 234 is engaged with the first contact means (here hollow rivet 239) through rotational movement of the key receiver 206.

For example, referring to assembly 200, a stationary electrically conductive contact plate or pin 244 is provided which abuts against the outside end 246 of the pin 231. Support means for the plate 244 is provided as follows: the assembly 200 is secured through flanges outwardly extending from the housing 201 to a bracket 247 mounted against a frame of a door member (not detailed) by means of nut and bolt assemblies 248. An aperture 249 is provided in the upstanding ear of bracket 247. A gromet 251 is extended through the aperture 249 and the plate 244 is then mounted through the gromet 251 on its inside edge, the plate 244 is secured to the bracket 247 by means of a retaining ring 252 on its outside face, the plate 244 is retained in position by means of electrical connector members 253. Thus, the plate 244 is adapted to maintain electrical contact with the pin 231 relative to the housing 201. The electrical connector 253 and a second electrical connector 254 (the latter being held in place by the hollow rivet 238) provide electrical connector means functionally associated with each of the first and second contact means (here, in assembly 200, in the configuration shown, rivet 239 and plate 244).

Figure 11:
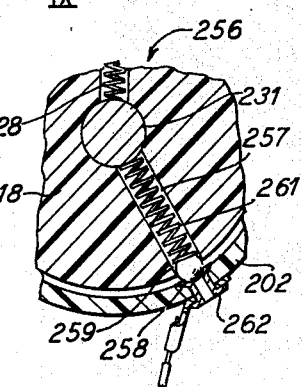
FIG. 11 is a fragmentary view which is similar to the view shown in FIG. 8, but illustrating a still further alternative embodiment of an alarm activating system of the present invention.

Assembly 200 can be modified so as to incorporate thereinto a different form of second electrically conductive contact means within the spirit and scope of the present invention. Thus, referring to FIG. 11, there is seen another embodiment of a switch assembly of this invention which is similar to the embodiment of assembly 200 and which other embodiment is herein designated for convenience generally by the numeral 256. Assembly 256 is generally similar to assembly 200 except that assembly 256 is provided with a second radially extending passageway 257 defined in the ring member 218 between the opening 226 and the circumferentially extending side wall portions 229 of the ring member 218.

In addition assembly 256 is provided with a second electrically conductive ball means 258 positioned in the radially outer mouth 259 of the passageway 257. The ball 258 is similarly provided with an electrically conductive biasing spring means 261 which both yieldingly urges the ball 258 radially outwardly away from the ring member 218 and which electrically interconnects the ball 258 with the pin 231.

A hollow rivet 262 which is similar in construction to the hollow rivets 238 and 239 extends through cylindrical side wall 202 of housing 201 to provide electrical contact means for contacting the ball 258. The hollow rivet 262 is both radially and axially aligned with the ball 258 and also is circumferentially spaced from the rivets 238 and 239. The spatial respective locations of the hollow rivet 262 with respect to the hollow rivets 238 and 239, as those skilled in the art will appreciate, is such that, when the first ball 234 is engaged with the rivet, for example, 239 the second ball 258 is engaged with the rivet 262.

As in the case of assembly 200, the assembly 256 can be provided with two hollow rivets 262 analogous to the hollow rivets 238 and 239. Preferably hollow rivets 262 are axially offset with respect to the hollow rivets 238 and 239 together with the engageable ball 258 operating therewith. The assembly 256 can likewise employ a plurality of hollow rivets 238 and 239 although preferably a pair thereof is used. The relationship between first contact means and second contact means in an assembly of the type illustrated by assembly 256 is such that when the first ball 234 is engaged with the first contact means (here hollow rivet 239) a second contact means (here rivet 262) is interconnected therewith by means of an electrically conductive path through the pin 231 of the assembly 256. It will be appreciated that certain components in the respective assemblies 256 and 200 are similarly numbered strictly as a matter of convenience in the present description.

Figure 7:
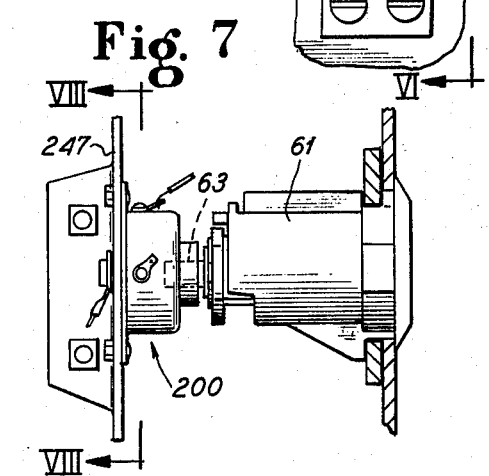
FIG. 7 is a vertical sectional view in fragmentary form through a portion of an automobile door illustrating a still further embodiment of an alarm activating system of the present invention.
Figure 8:
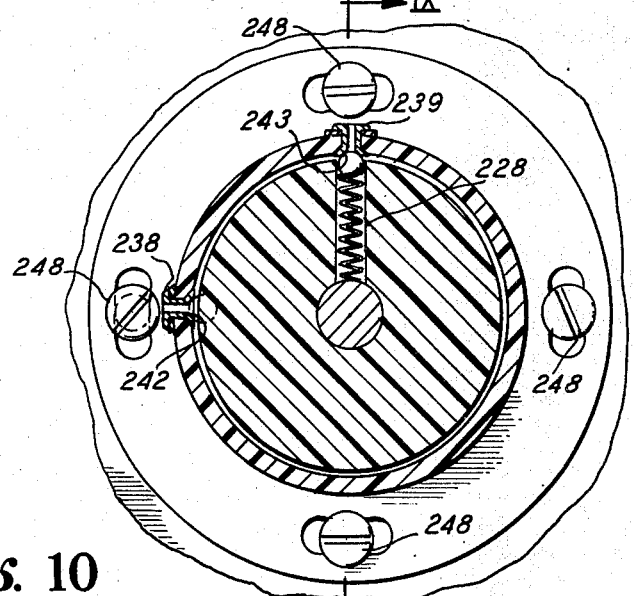
FIG. 8 is a sectional view taken along the line VIII—VIII of FIG. 7.
Figure 9:
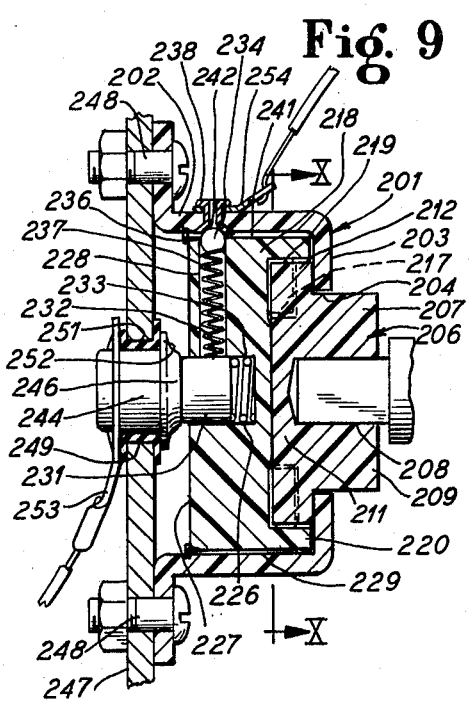
FIG. 9 is a view taken along the line IX—IX of FIG. 8.
Figure 10:
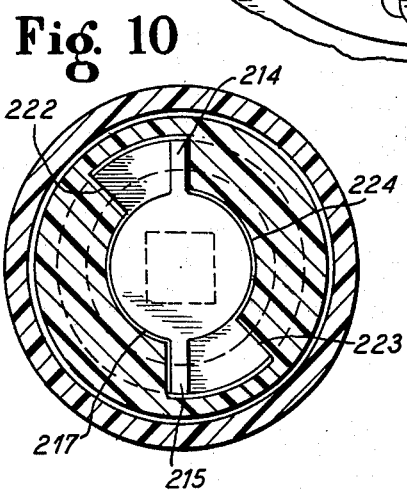
FIG. 10 is a sectional view taken along line X—X of FIG. 8.

Each of the assemblies 200 and 256 is engageable for functional purposes with a key activated, axially arcuately revolvable lock tumbler assembly of a conventional nature herein briefly illustrated in FIG. 7 by the component numbered 62. Such engagement is accomplished through the use of a suitably formed stub shaft 63. At its forward end (not detailed in either of FIGS. 7 or 9) the stub shaft 63 is axially aligned with the tumbler assembly 62 and is adapted for revolvable movements therewith. The rear end of stub shaft 63 is shaped so as to be extendable into the key way 208. Conveniently, for example, the rear end of stub shaft 63 and the key way 208 can have cross-sectionally circular rectangular configurations so that turning movements of the stub shaft 63 cause rotational movements of the key receiver 206 in either of the assemblies 200 or 256, as those skilled in the art will readily appreciate.

Turning to FIG. 12, there is seen one further embodiment of the invention which is designated in its entirety by the numeral 266. Assembly 266 is similar to assembly 256, except that here a center pin is entirely eliminated and the single channel 267 is formed diametrically through the ring member 268. In channel 267, a coiled compression spring 269 is positioned and in the opposed ends and at each opposed end 267 a ball 271 is positioned. Aligned with each ball 271 is a hollow rivet 272. Each rivet 272 (paired) extends through the housing 273 of the assembly 266. An electrical connector 274 here of the stock out type is clamped by each rivet 272 to the housing 273 and each connector 274 then provides means for connecting wires to the assembly 266. The assembly 266 is shown in an alarmed or on position, as those skilled in the art will appreciate. In order to disarm the assembly 266 through the operation of a key in a tumbler assembly (not shown) with which the assembly 266 is connected, neutral positions are provided in the assembly 266 which are, in assembly 266, located at 90° with respect to the on positions illustrated. However, any circumferential spacing between the neutral position and the on position can be used, as desired, which those skilled in the art will readily appreciate. The neutral or off position in assembly 266 is provided by a pair of opposed rivets 276, each of which is mounted through housing 273 in the manner of the rivets 272. Thus, when the ring 268 is rotated about its axis 277, the balls 271 become detented in the respective mouths of the rivets 276 at the neutral point, one ball 271 in each rivet 276.

Other and further embodiments of the present invention will be apparent to those skilled in the art without departing from the teachings of the present invention.

I claim:
1. A key-actuatable switch assembly comprising:
  A. an electrically non-conductive housing having cylindrical side walls and an interconnecting end wall, said end wall having an axially extending channel defined therein,
  B. an electrically non-conductive key receiver having:

1. an integral, cross-sectionally circular body portion extending through said channel and having an axially extending keyway defined therein on the outer face thereof,
2. an integral, cross-sectionally circular base portion coaxial with said body portion located in said housing having a shorter radius than said body portion,
3. integral flange means extending radially outwardly from said body portion between said body portion and said base portion and adapted to make sliding face-to-face engagement with inside regions of said housing located adjacent said channel, and
4. a pair of integral wings extending in radially opposed relationship to one another and radially outwardly extending from circumferential side wall portions of said base portion, C. an electrically non-conductive ring member for positioning interiorly of said housing generally coaxially therewith having:
1. a cross sectionally circular aperture defined in the forward face thereof which is adapted for receipt therein of said base portion,
2. a pair of arcuately extending recesses defined in said forward face and radially outwardly extending from circumferential side wall portions of said aperture in said ring member, said recessed portions being adapted for receipt therein of said wing means, said recessed portions cooperating with said wing means to permit limited rotational movement of said wing means relative to said recessed portions between radially extending circumferentially spaced engagement positions therebetween,
3. a radially extending passageway defined therein between at least the central region thereof and a circumferentially extending side wall portion thereof, D. an electrically conductive ball means positioned in the radially outer mouth of said passageway and including electrically conductive biasing means which both yieldingly urges said ball means radially outwardly away from said ring member, E. at least one first electrically conductive contact means extending through a portion of said cylindrical side walls of said housing, said first contact means being radially and axially aligned with said ball means, F. a second electrically conductive contact means adapted for making electrical contact with said ball means, said second contact means being so located relative both to said ball means and to said first contact means that an electrically conductive path between said first and said second contact means exists only when said ball means is engaged with said first contact means through rotational movement of said key receiver relative to said housing, and G. electrical connector means functionally associated with each of said first and said second contact means.

2. The switch assembly of claim 1 wherein:
A. said ring member further has a cross-sectionally circular opening defined in the rearward face thereof,
B. an electrically conductive cross-sectionally circular pin means is positioned in said opening and projects across the radially inner mouth of said passageway, said pin means including biasing means yieldingly urging said pin means axially outwardly away from said ring member, and
C. said biasing means of said ball means electrically interconnects said ball means with said pin means.

3. The switch assembly of claim 2 wherein said second electrically conductive contact means comprises:
A. an electrically conductive stationary contact plate means abutting against the outside end of said pin means,
B. support means for said plate means and adapted to maintain said plate means in electrical contact with said pin means relative to said housing,
C. said electrical terminal means being in functional contact with said plate means.

4. The switch assembly of claim 3 wherein
A. at least two of said first contact means are provided, each one extending through a different portion of said cylindrical side walls of said housing,
B. each said first contact means terminating inwardly and adjacent the inside surfaces of such associated side walls in a cup shaped pocket which is adapted for receipt therein of a portion of said ball means,
C. each said first contact means being radially and axially aligned with said ball means,
D. each said first contact means being circumferentially spaced from the other thereof by an angle greater than that angle subtended by each of said recesses.

5. The switch assembly of claim 1 wherein said second electrically conductive contact means comprises:
A. a second radially extending passageway defined in said ring member between said opening and a circumferentially extending side wall portion of said ring member,
B. a second electrically conductive ball means positioned in the radially outer mouth of said passageway and including second electrically conductive biasing means which both yieldingly urges said ball means radially outwardly away from said ring member and electrically interconnect said second ball means with said pin,
C. at least a second one of said first electrically conductive contact means extending through a portion of said cylindrical side walls of said housing,
D. said second one of said first contact means being both radially and axially aligned with said second ball means and also circumferentially spaced from said first contact means, the spatial respective locations of said first contact means and said second one of said first contact means being such that, when said first ball means is engaged with said first contact means, said second ball means is engaged with said second one of said first contact means.

6. The switch assembly of claim 5 wherein
A. at least two of said first contact means are provided, each one extending through a different portion of said cylindrical side walls of said housing,
B. each said first contact means terminating inwardly and adjacent the inside surfaces of such associated side walls in a cup shaped pocket which is adapted for receipt therein of a portion of said ball means,
C. each said first contact menas being radially and axially aligned with said ball means,
D. each said first contact means being circumferentially spaced from the other thereof by an angle greater than that angle subtended by each of said recesses E. the interrelationship between said first contact means and said second one(s) of said first contact means being such that when said first ball means is engaged with said first contact means an electrically conductive path exists between said first contact means and a said second one of said first contact means.

7. The assembly of claim 1 wherein said passageway extends diametrically through said ring member and said biasing of said ball means extends through said passageway and second electrically conductive ball means positioned in the opposed radially outer mouth of said passageway relative to that wherein said first electrically conductive ball means is so positioned.

* * * * *